(No Model.)

C. A. BEHLEN.
VEHICLE SPRING.

No. 307,000. Patented Oct. 21, 1884.

Attest
W. Ellwood Wynne
D. M. Strickland

Inventor
Charles A. Behlen
by James J. Cushing, Atty.

United States Patent Office.

CHARLES A. BEHLEN, OF CINCINNATI, OHIO, ASSIGNOR OF ONE-HALF TO GEORGE MOERLEIN, OF SAME PLACE.

VEHICLE-SPRING.

SPECIFICATION forming part of Letters Patent No. 307,000, dated October 21, 1884.

Application filed June 26, 1884. (No model.)

*To all whom it may concern:*

Be it known that I, CHARLES A. BEHLEN, a citizen of the United States, residing in Cincinnati, Hamilton county, State of Ohio, have invented certain new and useful Improvements in Vehicle-Springs, of which the following is a specification.

My invention relates to improvements in what are known as "elliptic springs," for use on vehicles; and it consists in the arrangement of the parts, substantially as shown and hereinafter described.

Figure 1:
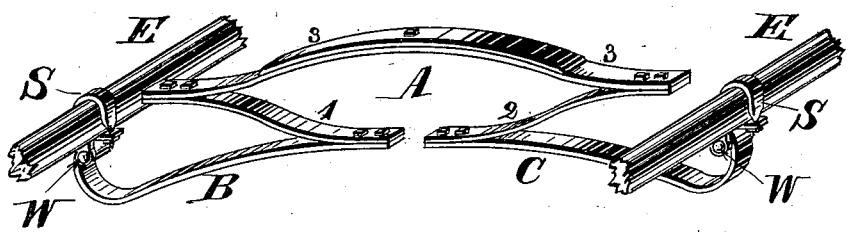
Figure 2:
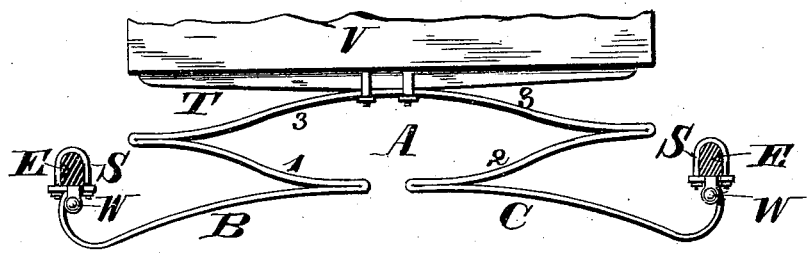
Figure 3:
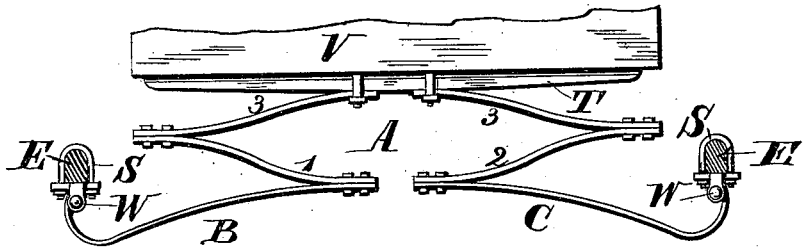

In the accompanying drawings, Figure 1 is a perspective view of my improved spring attached to the side bars of a buggy, and represents the spring constructed in parts, each part being bolted or riveted together, so as to form the whole. Fig. 2 is a front view showing the spring attached to the spring-bar of the vehicle, and is a modification of the spring shown in Fig. 1, in that it is bent complete in one piece instead of being constructed in sections and then put together. Fig. 3 is a view of the spring similar to that in Fig. 2, and is a modification of those shown in Figs. 1 and 2, in that the spring is constructed in two parts and in sections, so that when attached to the bolster or side bars of the vehicle the same functions will be performed in substantially the same way as will be performed by the springs shown in Figs. 1 and 2.

A, Fig. 1, is an ordinary elliptic spring, having its lower leaf divided and provided with branches B C. By means of these branches the spring is attached to the side bars E of the vehicle V by the ordinary shackles, S, and clip W, as shown; or when side bars are not used it may be fastened to the ordinary bolster and the rear axle. The division of the bottom leaf of the spring enables it to be mounted upon its bearings, so as to fit between and clear the perch and hang the body of the vehicle either high or low, as desired. This is one of the especial features of my spring, as it overcomes the great disadvantage in this respect heretofore experienced by carriage and wagon makers.

T represents the ordinary spring-bar.

When action is imparted to the spring, instead of the elliptic portion collapsing, as in the springs of the ordinary construction, the portions 1 and 2 will recede from the upper leaf, 3, and cause the branches B and C to be depressed at their point of connection with 1 and 2, and the strain communicated to those branches at their points of connection to the side bars. Any rebound which follows will be taken up and cushioned by the upper leaf, 3.

Instead of constructing the spring in sections and then bolting or riveting them together, as seen in Fig. 1, I may form it out of one complete piece of metal, as seen in Fig. 2; or instead of having one spring, as shown in Figs. 1 and 2, I may construct the portions so as to form a half-spring, which, when attached to the vehicle in the ordinary way, as seen in Fig. 3, practically forms a spring such as is illustrated in Figs. 1 and 2. This latter method of construction is very useful, as in case one of the parts becomes damaged it can be removed and replaced by a new piece without disturbing the other portions.

Instead of having the leaf 3 curved, as shown, it may be perfectly straight, and the same results accomplished.

The spring can be made heavy or light, as the case might be, by adding more leaves, so as to conform to the size of vehicle and the weight it is designed to carry. I thus provide a spring which is cheap, strong, and durable, and one which will not detract from the finish of the vehicle, besides furnishing an easy and graceful motion that is not attained by any of the springs now in the market.

Having thus described my invention, what I claim, and desire to secure by Letters Patent, is—

1. An elliptic spring having its lower leaf or leaves extending inward toward each other, but separated at their inner ends a distance sufficient to permit the perch of a vehicle to pass between them when in action, substantially as set forth.

2. A vehicle-spring consisting of an upper leaf or member, 3, inwardly-extending leaves or members 1 and 2, and outwardly-extending branches B C, for attachment to a side bar or other part of a vehicle, the inner ends of the leaves or members 1 and 2 being separated from each other, substantially as and for the purpose set forth.

3. The herein-described spring, consisting of upper leaf, 3, inwardly-turned leaves 1 and 2, and outwardly-extending branches B C, all formed of one integral piece of metal, substantially as and for the purpose set forth.

CHARLES A. BEHLEN.

Witnesses:
W. ELLWOOD WYNNE,
MAT BRADY.